Dec. 29, 1959   W. E. FORTMANN   2,918,792
FUEL CONTROL WITH FORCE MULTIPLICATION
Filed Sept. 21, 1956   3 Sheets-Sheet 1

INVENTOR
WILLIAM E. FORTMANN
BY Leonard F. Wekelind
ATTORNEY

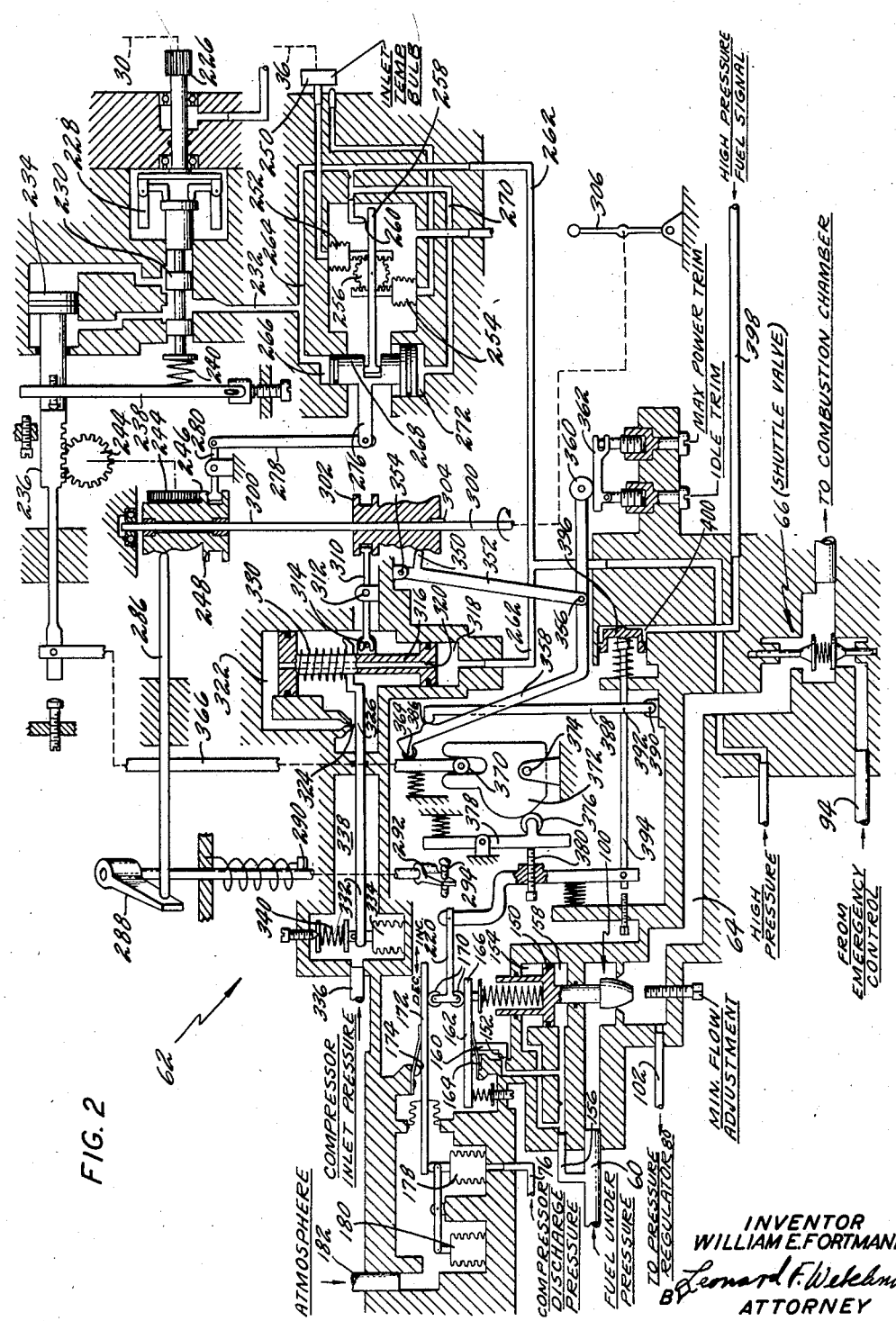

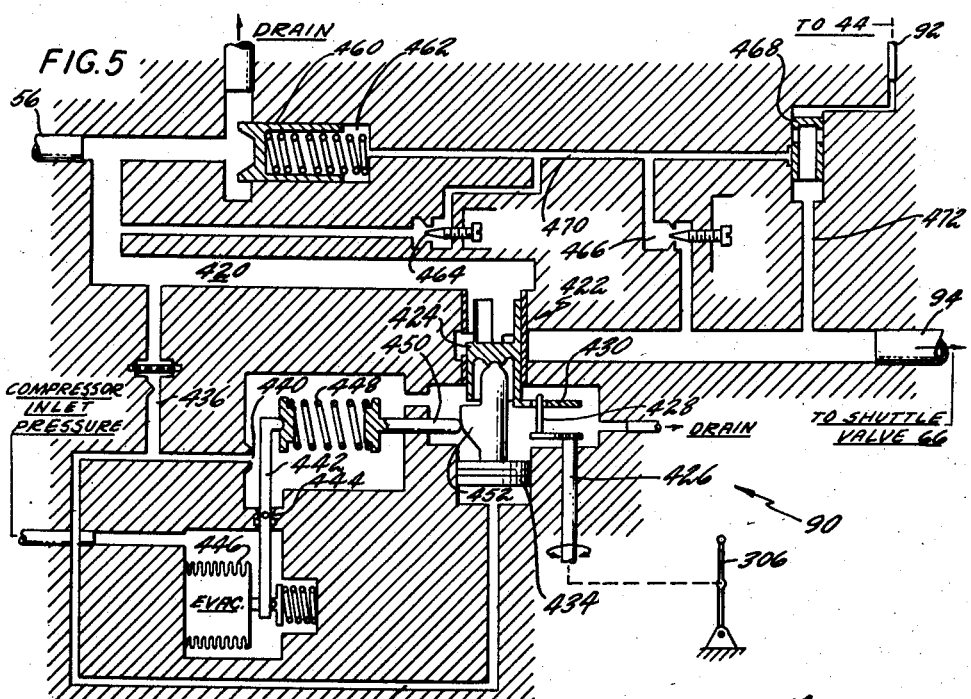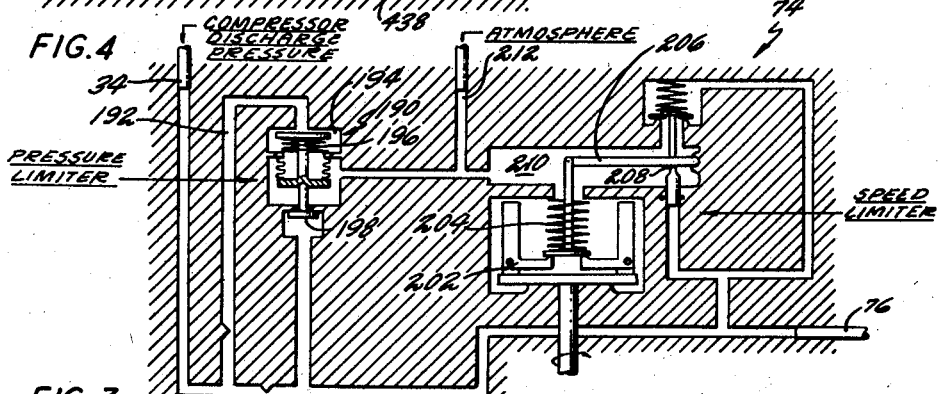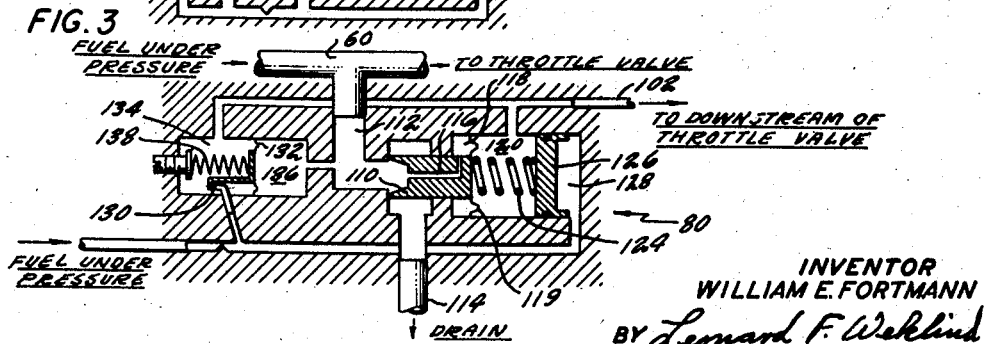

United States Patent Office 2,918,792
Patented Dec. 29, 1959

2,918,792

FUEL CONTROL WITH FORCE MULTIPLICATION

William E. Fortmann, Farmington, Conn., assignor to United Aircraft Corporation, East Hartford, Conn., a corporation of Delaware Application September 21, 1956, Serial No. 611,238

13 Claims. (Cl. 60—39.28)

This invention relates to fuel controls and more particularly to fuel controls having force multiplication control mechanism for controlling the flow mechanism.

It is an object of this invention to provide fuel control having a force multiplication system for controlling a fluid flow regulating device such as a throttle valve.

It is a further object of this invention to provide a fuel control having a particular force multiplication system in combination with particular signal generating servo devices responsive to specific variables of power plant operation.

These and other objects of this invention will become readily apparent from the following detailed description of the drawing in which:

Fig. 2 is a schematic illustration of the main control unit;

Fig. 3 is an enlarged cross sectional illustration of the pressure regulator;

Fig. 4 is an enlarged schematic of the topping and speed limiting unit; and

Fig. 5 is a schematic enlargement of the emergency control unit.

Figure 1:
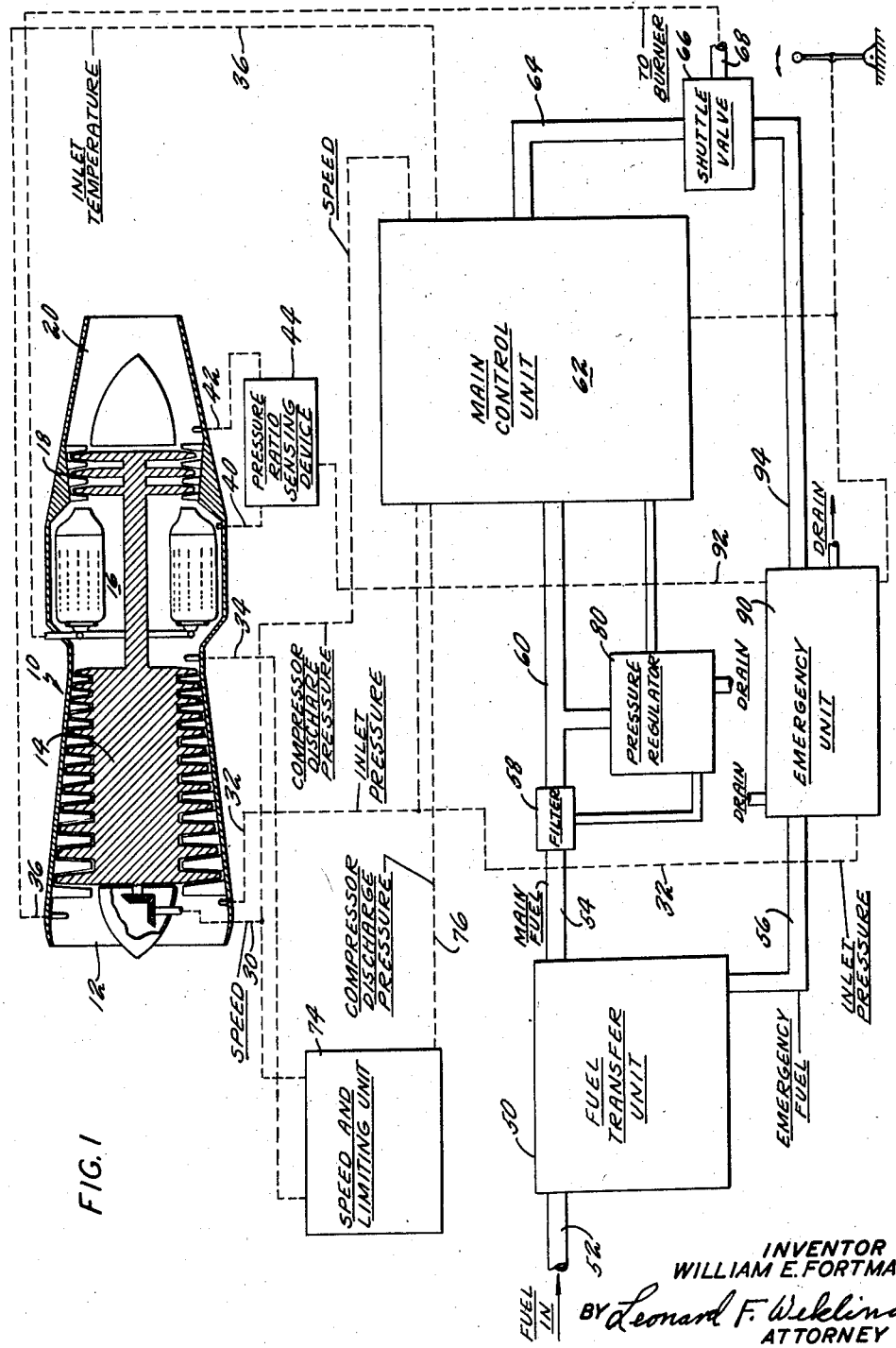
Fig. 1 is a cross sectional schematic of a power plant including a block diagram of the control of this invention.

Referring to Fig. 1, a turbine type power plant is generally indicated at 10 as having an inlet 12, a compressor section 14, a combustion chamber 16, a multiple stage turbine 18 and an exhaust nozzle 20. The control unit of this invention senses speed as shown by the dotted line 30, inlet pressure by means of the line 32, compressor discharge pressure by means of the line 34 and inlet air temperature by means of the line 36. The lines 40, 42 measure the pressure ratio across the turbine section to operate a pressure ratio sensing device 44 whose function will be described hereinafter.

The control of this invention comprises a fuel transfer unit 50 which receives fuel from a main inlet line 52 and directs the fuel to the main line 54 or 56. The line 54 passes through a filter 58 and by means of line 60 flows to the main control unit 62. The main control unit 62 then feeds fuel to a line 64 leading to a shuttle valve 66 and a main feed line 68 leading to the combustion chamber 16. The topping and speed limiting unit 74 senses speed via the shaft 30 and compressor discharge pressure via the line 34 and modifies the compressor discharge signal which is fed via the line 76 to the main control unit 62. A pressure regulator 80 senses the pressure on the upstream and downstream sides of the main throttle valve of the main control unit 62 and maintains the pressure drop thereacross substantially constant. The emergency fuel control unit 90 senses compressor inlet pressure via the line 32 and receives a signal from the power lever. Fuel flows from the emergency unit 90 via the line 94 to the shuttle valve 66 so that it can be properly directed to the line 68 and the combustion chamber 16.

The main fuel control unit 62 is more clearly illustrated in Fig. 2. Primarily, fuel under pressure is fed to the line 60 and is metered or regulated by a main throttle valve 100. Fuel from the main throttle valve 100 then flows to the line 64 leading to the shuttle valve 66. The pressure drop across the throttle valve 100 is maintained substantially constant by means of the pressure regulator 80 more clearly shown in Fig. 3. The pressure regulator receives fuel under pressure upstream of the throttle valve via the line 60. Pressure regulator 80 also receives fluid under pressure from downstream of the throttle valve by means of the line 102, see Figs. 2 and 3. The pressure regulator 80 comprises a main by-pass type valve 110 which receives fluid from the line 60 and the line 112 and by-passes a portion thereof to the drain line 114. A diaphragm 119 senses pressure from upstream of the throttle valve via the lines 112 and passage 116 which leads to the chamber 118 on one side of the diaphragm 119. The other side of the diaphragm 119 receives fluid under pressure existing at the downstream side of the throttle valve via the line 102 and chamber 120. In order to correct for errors in the valve element 110 a reset type mechanism is provided. This mechanism comprises a spring 124 whose compression is varied by a servo piston 126 depending upon the pressure existing in a variable volume chamber 128. The pressure in the chamber 128 is controlled by a variable orifice 130 which is controlled by the pressures existing on either side of a diaphragm 132. Thus the chamber 134 on the left side of the diaphragm 132 is subject to pressure downstream of the throttle valve while the chamber 136 on the right-hand side of the diaphragm 132 is subject to pressure on the upstream side of the main throttle valve 100. Since there is very little flow in chambers 134 and 136 the pressures therein will not be affected by the momentum of the fuel. Thus, the diaphragm 132 and the spring 138 control the opening of the variable orifice 130 to in turn control the pressure in the chamber 128 on the right-hand side of the piston 126.

This reset type servo is more clearly described and claimed in patent application Serial No. 611,339 for Pressure Regulating System filed as of even date by Thomas P. Farkas.

The main throttle valve 100 is moved by a servo and the piston 150 whose position is controlled by a variable orifice 152. Thus, the upper chamber 154 is continuously exposed to high pressure fluid from the main line 60 and the line 156. On the other hand, the lower chamber 158 has the high pressure fluid therein regulated by the variable orifice 152, thus the area of the orifice 152 is a function of the position of the main throttle valve 100. The orifice 152 has its area varied by a depending arm 160 carried by a rod 162 pivoted at 164. Bar 162 is moved about its pivot 164 depending upon the pressure exerted on the right-hand side 166 thereof.

The throttle valve servo system is clearly shown and described in the above-referred-to co-pending application Serial No. 611,339 of Thomas P. Farkas.

The force balance system for controlling the throttle valve servo is disclosed and more broadly claimed in co-pending application Serial No. 528,878, filed August 17, 1955, by William E. Fortmann.

The force exerted on the right-hand end 166 of the bar 162 depends upon the pressure exerted by the rollers 170 and the force exerted by the right-hand end of the bar 172 which is pivoted about 174. The bar 172 has its left end controlled by a bellows 178 which receives compressor discharge pressure from the line 76. A cooperating evacuated bellows 180 provides the system with an absolute pressure signal.

The outside of both bellows 178 and 180 is subject to atmospheric pressure from the line 182.

In discussing the compressor discharge signal which is transmitted to the throttle valve controlling bar 172, the topping and speed limiting system is best described at this point.

The compressor discharge pressure signal received by the line 76 and bellows 178 is transmitted thereto from the topping and limiting unit 74 clearly shown in Fig. 4. Herein compressor discharge pressure is received from the line 34 and is eventually fed to the line 76. A compressor pressure limiting unit is generally indicated at 190. When the compressor discharge pressure exceeds a predetermined amount the pressure in line 192 and chamber 194 will rise sufficiently to exert a force against the preset spring 196 so as to open the valve 198. When the valve 198 is open the pressure being fed to the line 76 is false or lower than the actual compressor discharge pressure so that the main fuel control unit will obtain a signal for a decrease of fuel.

Likewise a speed signal is received via the shaft 30 which in turn rotates a speed governor 202. When the speed of rotation of the governor 202 reaches a high enough value the speeder spring 204 will be compressed thereby moving the arm 206 upwardly thereby to increase the opening of the variable area orifice 208. This action also bleeds air from the line 76 to the chamber 210 and the atmospheric vent 212. Thus, it is seen that the topping and limiting unit 74 can bleed the compressor discharge pressure signal to reduce fuel flow should either the compressor discharge pressure or the speed of rotation of the power plant exceed a predetermined value.

Returning to Fig. 2, it will be seen that the main throttle valve 100 is positioned in accordance with a compressor discharge pressure signal fed to the horizontal bar 172 which engages the rollers 170. Horizontal movement of the rollers 170 results from a signal eventually reaching the horizontal arm 220 connected to the rollers 170. The signal reaching the horizontal arm 220 is a result of a number of variables of power plant operation.

In the upper right-hand corner of Fig. 2 a gear 226 is illustrated as receiving a speed signal via the shaft 30 which, as seen in Fig. 1, connects to the power plant shaft. The gear 226 rotates a speed governor 228 which positions a pilot or control valve 230. The control valve 230 receives fluid under high pressure from the line 232 and meters it to either side of a servo piston 234 which in turn is connected to a rack 236. The piston 234 engages a feed-back arm 238 which in turn varies the pressure on a spring 240 engaging the control valve 230. The rack 236 in turn rotates the pinion gear 244 which is shown both in plan view and end view and connected by broken lines for purposes of simple illustration. Pinion gear 244 engages a segmental tooth section 246 carried by a three dimensional cam 248. Thus, the speed signal generated by the speed governor 228 operates through its associated servo mechanism to rotate the three dimensional cam 248.

Just below the speed governor 228 in Fig. 2 a temperature sensing bulb 250 is illustrated as receiving its signal from the line 36 leading to the inlet 12 (Fig. 1) of the power plant. The temperature signal is fed to a main actuating bellows 252 which has associated therewith a correction bellows 254 whereby a gear 256 is operated. The gear 256 is carried by a bar 258 which varies the opening of the variable area orifice 260. Thus, with high pressure fluid being fed to the system via the line 262 the line 264 will also be under constant high pressure as will the chamber 266 on the top of servo piston 268. However, depending upon the opening of the variable area orifice 260 the pressure in the line 270 as well as the chamber 272 on the bottom side of the servo piston 268 will be at a somewhat lower pressure. Thus, depending upon the variable area orifice 260 the piston 268 will assume a predetermined position. Thus, motion of the servo piston 268 moves the depending arm 276 and the vertical link 278 and pin 280 to impart vertical motion to the three dimensional cam 248.

Therefore, the signal received by the horizontal rod 286 which engages the three dimensional cam 248 will be a combined signal representing actual power plant speed or r.p.m. and inlet air temperature.

The speed and inlet temperature signal which is received by the rod 286 is transmitted to a lever 288 which abuts the left end of the rod 286. The lever 288 rotates a spring loaded vertical rod 290 which carries at its bottom end a lever 292 and an abutment or stop 294. The member 294 in turn limits the horizontal movement of the adjacent lever 220 and thereby provides an acceleration limit for the fuel control. In other words, the stop 294 prevents too rapid an increase in fuel flow until the power plant is capable of handling larger amounts of fuel depending upon the inlet temperature and r.p.m.

The three dimensional cam 248 is mounted freely on a vertical shaft 300. However, another three dimensional cam 302 is fixed to the shaft 300 by a key 304. The shaft 300 is connected to the pilot's power lever 306 so that the cam 302 is rotated in response to movement of the power lever 306. Rotation of the cam 302 represents a desired speed setting signal.

The cam 302 is reciprocated by a lever 310 which is pivoted intermediate its ends at 312 and is connected at its left end 314 to a servo piston 316. The servo piston 316 is subject to high pressure fluid on the bottom side thereof by fluid which flows from the line 262 into the chamber 318. This fluid passes through an orifice 320 and then to the top side of the piston 316 to the chamber 322. Fluid in the chamber 322 is bled therefrom by a variable area orifice 324. The opening of the orifice 324 is regulated by an arm 326 biased at its right end by the spring 330 and moved at its left end 332 by an evacuated bellows 334. Compressor inlet pressure is received by the pipe 336 and passes into the chamber 338 whereby it acts on the outside of the bellows 334. A spring 340 provides an adjustable bias.

Thus, in summary, it should be noted that the second three dimensional cam 302 provides a speed setting signal which is biased by inlet air pressure. This combined signal is received by a cam follower 350 which moves a link 352 pivoted at its upper end at 354. The lower end of the link 352 is connected at 356 to a link 358 which carries a roller 360 at its right end. The roller 360 engages a member 362 which provides suitable adjustment as noted in the drawing. The extreme upper left end of link 358 has a roller 364 engaging a vertical rod 366. The vertical rod 366 is operably connected to the rack 236 shown in the upper portion of Fig. 2. Thus, the rack 236 transmits a signal to the rod 366 and the roller 364 representing an actual power plant speed signal. The lever 366 thereby receives both a speed setting and an actual speed signal thereby creating a speed error signal. The speed error signal is transmitted to the lower end of rod 366 to a roller 370 which rotates a cam 372 pivoted at 374. A cam follower 376 is carried by a pivoted link 378 which engages at set screw 380. The upper portion of set screw 380 is operably connected to the horizontal rod 220 which in turn moves the rollers 170 for actuating the main throttle valve 100.

The purpose of the roller 370 and the cam 372 just described is intended to provide a safety type linkage which cannot be overloaded, thus, the cam 372 has an outer curved surface which has a constant radius over a portion thereof so that excessive motion of the roller 370 and the rod 366 in relation to pilot's power lever setting will not damage the mechanism.

Adjacent the upper left-hand end of the rod 358 which transmits the speed setting signal a pivoted or contact point 386 is provided. This point is engaged by the upper end of a vertical rod 388 which is pivoted at 390. The rod 388 is connected at 392 to a horizontal rod 394 which carries at its right end a spring loaded piston 396. When the power plant afterburner, for example, is put into operation, a high pressure signal is received from the line 398 so that high pressure exists in the right-hand side of chamber 400 of the piston 396. This moves the horizontal rod 394 to the left thereby moving the vertical rod 388 toward the left or counter-clockwise around its pivot 390. This motion through the linkage thus described tends to decrease fuel flow by a certain amount.

Fig. 5 illustrates the emergency portion of the fuel control of this invention. Fuel is received from the transfer unit 50 via the line 56 and flows into the line 420. The fuel is metered or regulated by a window type main throttle valve 422 and then flows outwardly through the line 94 to the shuttle valve 66. The main valve 422 comprises a plurality of ports in the body thereof and a sleeve 424 which is both rotatable and reciprocable. The pilot's power lever rotates a rod 426 which moves a pin 428 which engages an arm 430 carried by the sleeve 424. Thus, the power lever 306 and the rod 426 rotate the sleeve 424. The sleeve 424 is reciprocated by a servo piston 434 which receives high pressure fluid from the line 420 via the line 436 and line 438. This high pressure fluid, however, is regulated by means of a variable area orifice 440 whose opening is controlled by an arm 442 pivoted at 444. The lower end of arm 442 is moved by an evacuated bellows 446 which is surrounded by compressor inlet air. The upper end of arm 442 engages a feed-back spring 448 which in turn has a cam follower 450 engaging the cam 452 which is connected to the servo piston 434. The pressure drop across the main throttle valve 422 is regulated by means of a by-pass type pressure regulator valve 460. This valve 460 regulates the pressure differential across adjustable orifice 464. In addition, adjustable orifice 466 is positioned to provide a fixed differential pressure across the main throttle valve 422. These valves are intended to co-operate with a valve 468 which, when moved in a downward direction, can bypass the orifice 466. Thus, should the pressure ratio across the turbine section 18 exceed a certain value, a high pressure signal will be received from the pressure ratio sensing device 44 (Fig. 1) to move the valve 468 downwardly so that the orifice 466 is bypassed and the pressure drop across the throttle valve 422 will be reduced by a given amount. The pressure ratio device may be of the type described in the following article: SAE preprint No. 612, "A New Approach to Turbojet and Ramjet Engine Control, 1955, by Wendall Read."

Thus, for example, if we set the orifice or restriction 464 to provide, for example, a 25 p.s.i. drop with a given flow, the orifice or restriction 466 may be adjusted to provide a 75 p.s.i. drop. With a 25 p.s.i. spring backing up the pressure regulated valve 460, this valve will act to maintain a 25 p.s.i. drop across the restriction 464. The result is a 100 p.s.i. regulated pressure drop across the throttle valve 21. Now, if, for example, the pressure ratio across the turbine is such that the shuttle valve 468 is moved downwardly, the line 470 is now open to the line 472 and line 94 bypassing the restriction 466. This immediately drops the pressure in the chamber 462 behind the pressure regulated valve 460 since the restriction to flow through the valve 468 is much less than that at the orifice 466. As a result, the pressure regulated valve 460 moves toward the right decreasing the pressure drop across the throttle valve 422 and thereby decreasing fuel flow by a given percentage. If the system were designed for values of pressure drops as described above, the decrease of fuel flow will be exactly 50%.

The reduction of fuel flow by a given percentage can be shown as follows. The flow through the throttle valve 422 can be expressed as follows:

$$Q = CA\sqrt{\Delta P}$$

Where
$Q$ = fuel flow
$C$ = constant
$A$ = area of throttle valve 422
$\Delta P$ = pressure drop across throttle valve For any given condition both C and A at the throttle valve will be constant and Q or fuel flow before and after the opening of valve 468 will be a ratio of the square root of the pressure drops for these two conditions.

Hence $$Q_1 = \sqrt{100} = 10$$
$$Q_2 = \sqrt{25} = 5$$

This is a 50% decrease in fuel flow between the open and closed positions of valve 468.

As a result of this invention a highly efficient and accurate fuel control mechanism has been provided both for normal operation and for emergency conditions.

Although only one embodiment of this invention has been illustrated and described herein, it will be apparent that various changes and modifications may be made in the construction and arrangement of the various parts without departing from the scope of this novel concept.

What it is desired by Letters Patent is:

1. In a fuel control for a power plant, a source of fuel under pressure, means for regulating the flow of fuel from said source to the power plant, including a flow metering orifice, means responsive to the combined speed of the power plant and an operating temperature of the power plant upstream of the combustion chamber for producing a first signal, a power lever for the power plant, means responsive to the combined position of said power lever and air pressure at the air inlet to the power plant for producing a second signal, means responsive to compressor discharge pressure for producing a third signal, means for receiving said combined signals including a servomotor for controlling the area of said orifice, hydraulic control valve operatively connected to and regulating said servomotor, and a spring connection between said servomotor and said valve whereby motion of said servomotor and valve varies the pressure on each end of said spring, respectively.

2. In a fuel control for a power plant having a compressor and a combustion chamber, a source of fuel under pressure, means for regulating the flow of fuel from said source to said combustion chamber including a flow metering orifice, means responsive to the combined speed of the compressor and an operative temperature of the power plant upstream of the combustion chamber for producing a first signal, a power lever for the power plant, means responsive to the combined position of said power lever and pressure of the air upstream of the compressor for producing a second signal, means for receiving said signals including a servo motor for controlling the area of said orifice, a variable orifice for controlling said servo motor, a pivoted bar carrying an orifice area varying element intermediate its ends, one end of said bar being engaged by said signal receiving means and having a mechanical connection to said servo motor, and the other end of said bar being engaged by an adjustable spring.

3. In a fuel control for a power plant having a compressor and a combustion chamber, a source of fuel under pressure, means for regulating the flow of fuel from said source to said combustion chamber including a variable area orifice, means responsive to the combined speed of the compressor and temperature of the gases upstream of said combustion chamber for producing a first signal, a power lever for the power plant, means responsive to the combined position of said power lever and pressure of the air inlet upstream of the compressor for producing a second signal, means responsive to a power plant gas pressure for producing a third signal, means for receiving said signals, a servo motor for varying the area of said orifice, said servo motor including a variable volume chamber, a valve for regulating the pressure in said chamber including an operative connection to said signal receiving means, means responsive to the position of said servo for biasing said valve, and an adjustable spring for further biasing said valve.

4. In a fuel control for a power plant having a compressor and a combustion chamber, a source of fuel under pressure, means for regulating the flow of fuel from said source to said combustion chamber including a flow metering orifice, means responsive to the combined speed of the compressor and power plant operating temperature upstream of the combustion chamber including a servo device for producing a first signal, a power lever for the power plant, means responsive to the combined position of said power lever and air pressure upstream of the compressor for producing a second signal, means for receiving and combining said signals including a servo motor for controlling the area of said orifice, a variable orifice for controlling said servo motor, a pivoted bar carrying an orifice area varying element intermediate its ends, one end of said bar being engaged by said signal receiving means and having a spring connection to said servo motor, and the other end of said bar being engaged by an adjustable spring.

5. In a fuel control for a power plant having a compressor and a combustion chamber, a source of fuel under pressure, means for regulating the flow of fuel from said source to said combustion chamber including a first variable area orifice, means responsive to the combined speed of rotation of the compressor and a power plant temperature upstream of the combustion chamber for producing a first signal, a power lever for the power plant, means responsive to the position of said power lever and the gas pressure upstream of the compressor for producing a second signal, means for receiving said signals and producing a first force, means responsive to compressor pressure for producing a second force, a servo motor operatively connected to said first orifice for varying the area thereof, means for multiplying said forces, a second variable orifice for controlling said servo motor, a pivoted bar including means for varying the area of said orifice, one end of said bar being engaged by said force multiplying means and having a mechanical connection to said servo motor, and the other end of said bar being engaged by an adjustable spring.

6. In a fuel control for a power plant having a rotatable compressor and a combustion chamber, a source of fuel under pressure, means for regulating the flow of fuel from said source to said combustion chamber, means responsive to the combined speed of the compressor and a temperature of the gas in the power plant for producing a first signal, a power lever for the power plant, means responsive to the combined position of said power lever and air pressure upstream of the compressor for producing a second signal, means responsive to a power plant operating pressure for producing a third signal, means for receiving said first and second signals and producing a resultant signal, means for multiplying the effect of said resultant signal and said third signal, a servo motor for controlling said orifice, said servo motor including a variable volume chamber, a valve for regulating the pressure in said chamber including an operative connection to said signal multiplying means, and means responsive to the position of said servo for biasing said valve.

7. In a fuel control for a power plant having a compressor and a combustion chamber, a source of fuel under pressure, means for regulating the flow of fuel from said source to said combustion chamber, means responsive to the combined speed of the compressor and a gas temperature in the power plant for producing a first signal, a power lever for the power plant, means responsive to the combined position of said power lever and air pressure upstream of the compressor for producing a second signal, means for combining said first and second signals, means responsive to a power plant pressure for producing a third signal, means for receiving said combined signal and said third signal including a force multiplying linkage, a servo motor for controlling said fuel regulating means, said servo motor including a variable volume chamber, a valve for regulating the pressure in said chamber including an operative connection to said linkage, means responsive to the position of said servo for biasing said valve including a spring connection therebetween, and an adjustable spring for further biasing said valve.

8. In a fuel control for a power plant having a compressor and a combustion chamber, a source of fuel under pressure, means for regulating the flow of fuel from said source to said combustion chamber including an orifice and a movable member for varying the area of said orifice, means responsive to speed of the compressor and temperature of the gas in the power plant upstream of the combustion chamber for producing a first signal, a power lever for the power plant, means responsive to the position of said power lever and the pressure upstream of the compressor for producing a second signal, means for receiving said signals and producing a first force, means responsive to compressor pressure for producing a second force, means for multiplying said forces and producing a final force for controlling said regulating means by positioning said movable member, and a force feedback from said member to said multiplying means.

9. In a fuel control in combination with a power plant having a rotatable compressor and combustion section, a source of fuel under pressure, means for regulating the flow of fuel from said source to said power plant including an orifice and a movable member for varying the area of said orifice, means responsive to the combined speed of rotation of the compressor and an operative temperature of the working fluid passing through the power plant at a point upstream of the combustion section for producing a first signal, manual means for setting a power plant speed and sensing compressor speed to provide a speed error signal, means sensing the air pressure at the inlet to the power plant, means receiving said speed error signal and responsive to said inlet air pressure sensing means for producing a second signal, means receiving said signals for producing a resultant signal, means responsive to the discharge pressure of said compressor for producing a third signal, and means for moving said movable member for controlling fuel flow as a function of the product of said resultant signal and said third signal.

10. In a fuel control in combination with a power plant having a rotatable compressor and combustion section, a source of fuel under pressure, means for regulating the flow of fuel from said source to said power plant including a metering orifice and a movable member for varying the area of said orifice, means responsive to the combined speed of rotation of the compressor and an operative temperature of the working fluid passing through the power plant at a point upstream of the combustion section for producing a first signal, manual means for setting a power plant speed and sensing compressor speed to provide a speed error signal, means sensing the air pressure at the inlet to the power plant, means receiving said speed error signal and responsive to said inlet air pressure sensing means for producing a second signal, means receiving said signals for producing a resultant signal, means responsive to the discharge pressure of said compressor for producing a third signal, means for moving said movable member for controlling fuel flow as a function of the product of said resultant signal and said third signal, and a force feedback between said movable member and said last-mentioned means.

11. In a fuel control in combination with a power plant having a rotatable compressor and combustion section, a source of fuel under pressure, means for regulating the flow of fuel from said source to said power plant including a metering orifice and a movable member for varying the area of said orifice, means responsive to the combined speed of rotation of the compressor and an operative temperature of the working fluid passing through the power plant at a point upstream of the combustion section for producing a first signal, manual means for setting a power plant speed and sensing compressor speed to provide a speed error signal, means sensing the air pressure at the inlet to the power plant, means receiving said speed error signal and responsive to said inlet air pressure sensing means for producing a second signal, means responsive to said signals and the discharge pressure of said compressor for positioning said movable member, and means for biasing said last-mentioned means in response to the position of said movable member.

12. In a fuel control for a power plant having a compressor and a combustion chamber, a source of fuel under pressure, means for regulating the flow of fuel from said source to said combustion chamber including a variable area orifice, means responsive to a desired speed setting providing a first signal, means responsive to the pressure at the inlet to the compressor for biasing said first signal to provide a biased signal, means responsive to actual speed of rotation of the compressor to provide a second signal, means for comparing said biased signal with said second signal to produce a speed error signal, means for producing a third signal responsive to compressor discharge pressure, means for multiplying said speed error signal and said third signal to provide a resultant signal, a servo device for varying the area of said variable area orifice, said resultant signal controlling said servo device, a feedback between said servo device and said multiplying means, and means responsive to actual speed of the compressor and temperature at the inlet to the compressor for limiting said speed error signal.

13. In a fuel control for a power plant having a compressor and a combustion chamber, a source of fuel under pressure, means for regulating the flow of fuel from said source to said combustion chamber including a variable area orifice, means responsive to a desired speed setting providing a first signal, means responsive to the pressure at the inlet to the compressor for biasing said first signal to provide a biased signal, means responsive to actual speed of rotation of the compressor to provide a second signal, means for comparing said biased signal with said second signal to produce a speed error signal, means for producing a third signal responsive to compressor discharge pressure, means for multiplying said speed error signal and said third signal to provide a resultant signal, a servo device for varying the area of said variable area orifice, said resultant signal controlling said servo device, a spring feedback between said servo device and said multiplying means for varying the force thereon, and means responsive to actual speed of the compressor and temperature at the inlet to the compressor for mechanically limiting the effect of said speed error signal.

References Cited in the file of this patent
UNITED STATES PATENTS
2,675,674    Lee ------------------ Apr. 20, 1954

UNITED STATES PATENT OFFICE

CERTIFICATE OF CORRECTION

Patent No. 2,918,792                                                      December 29, 1959

William E. Fortmann

It is hereby certified that error appears in the printed specification of the above numbered patent requiring correction and that the said Letters Patent should read as corrected below.

Column 7, lines 40 to 42, strike out "a servo motor operatively connected to said first orifice for varying the area thereof," and insert the same after "forces," in line 43, same column.

Signed and sealed this 7th day of June 1960.

(SEAL)
Attest:

KARL H. AXLINE                                                    ROBERT C. WATSON
Attesting Officer                                              Commissioner of Patents